May 16, 1967 R. A. CLARK 3,319,290
RADIAL COMPRESSION DIE MOLDING APPARATUS
Filed Oct. 28, 1964 3 Sheets-Sheet 3
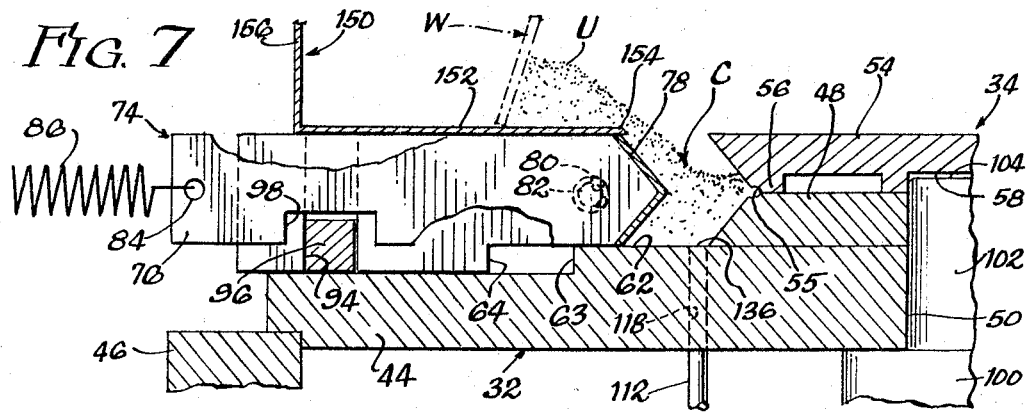
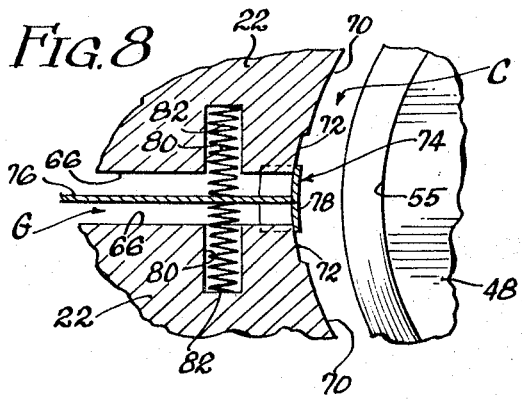
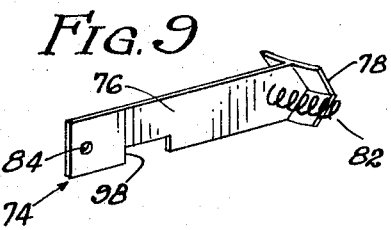
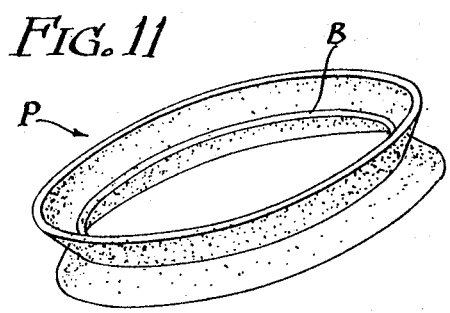
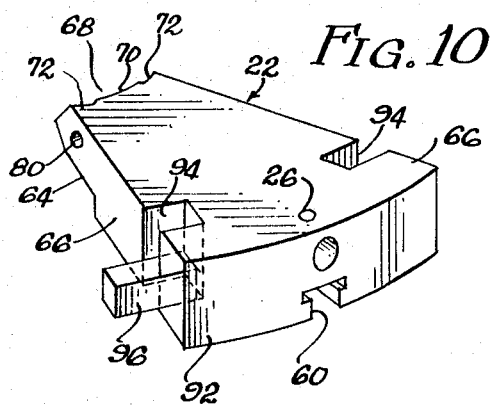
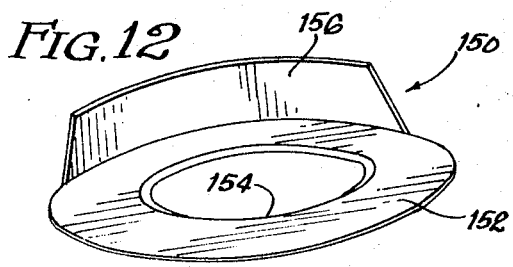
INVENTOR
Robert A. Clark
By Horton, Davis,
Brewer & Brugman
Attys United States Patent Office 3,319,290
Patented May 16, 1967

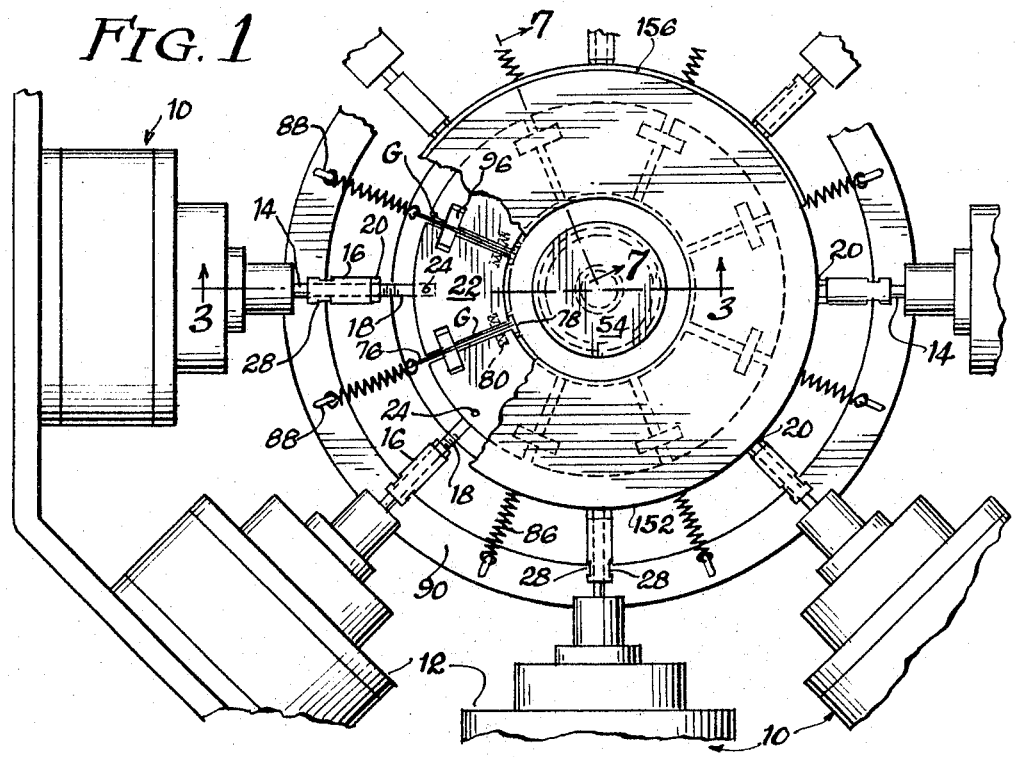

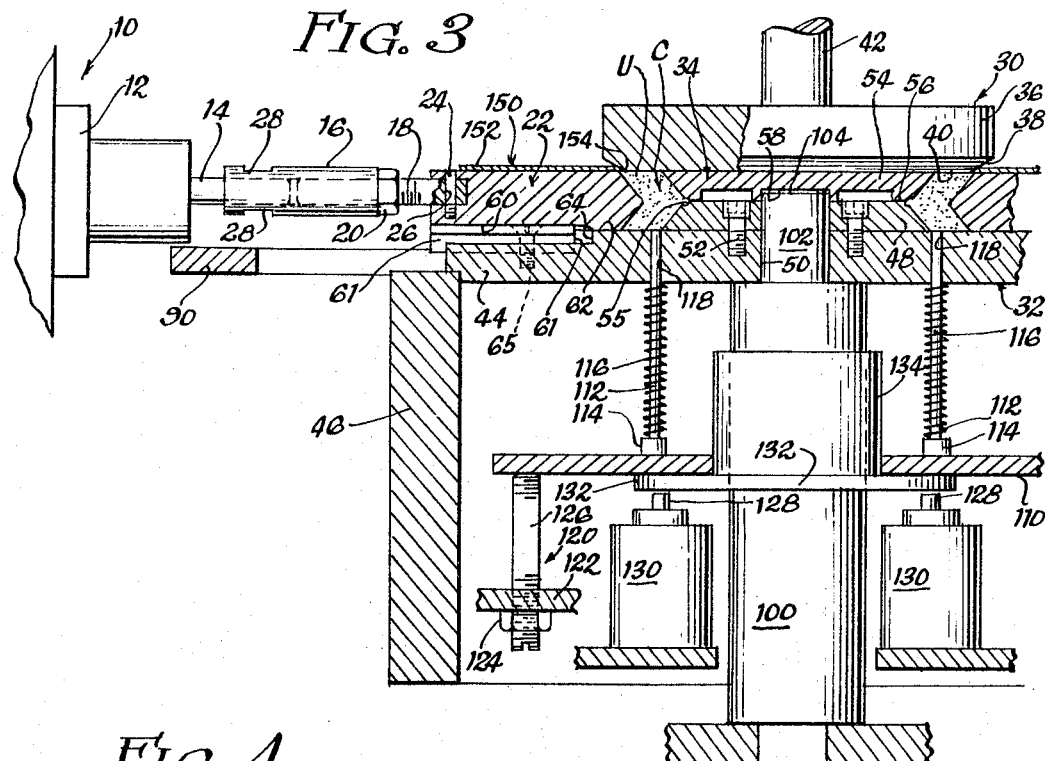
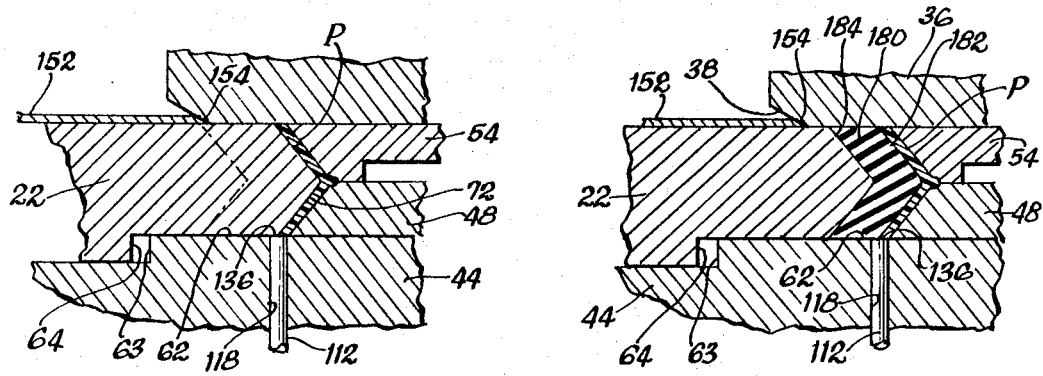
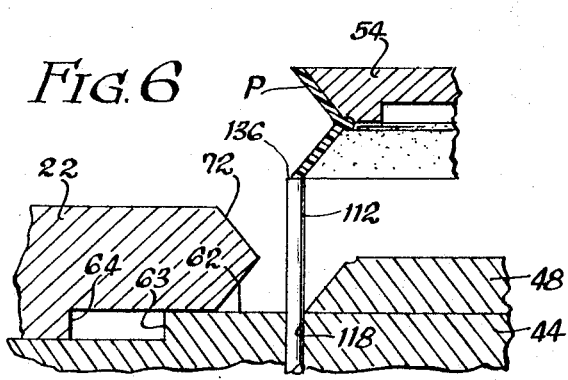

3,319,290
RADIAL COMPRESSION DIE MOLDING
APPARATUS
Robert A. Clark, La Grange, Ill., assignor to Chicago Gasket Company, Chicago, Ill., a corporation of Illinois
Filed Oct. 28, 1964, Ser. No. 407,191
10 Claims. (Cl. 18—5)

This invention relates to radial molding means which are particularly useful for molding powdered materials.

In the manufacture of molded articles from discrete particles such as powdered metals and powdered plastics such as polytetrafluoroethylene (hereafter TFE), it is important to obtain as precisely defined a product as possible so that little or no subsequent machining is necessary. It is also desirable to obtain a rate of manufacture as great as possible with the greatest precision available.

Therefore this invention contemplates a radial die means having a movable die face and movable spaced die segments in which movable means are provided for bridging the spaces between said die segments in all positions of said die segments thereby to provide a molded object having as precise a surface as possible at that surface molded by said movable die face.

It is therefore an object of this invention to provide novel radial die means for producing a precisely configured object at high rates of speed, for producing thin-walled objects and for producing objects with undercuts not easily molded by conventionally used molding means.

It is a further object of this invention to provide a radial die means having a movable die face for producing thin-walled objects more easily and more precisely than is possible with conventionally used molding processes.

Yet another object of this invention is to provide a radial die means having a plurality of movable spaced segmental die members and means for bridging the spaces therebetween during a molding operation to provide a movable die face having a substantially continuous and uniform surface.

Also contemplated as an object of this invention is the provision of novel radial die means having a plurality of spaced adjacent die segments movable radially in a common plane between a first inoperative position and a second compression position and means lying across the spaces between adjacent die segments in all positions of said die segments between said first and said second positions and movable with said die segments therebetween to define a die face which defines a surface in the molded object of the greatest possible precision.

Still another object of this invention is the provision of novel radial die means for molding objects, such as those of TFE, including a movable die face incorporating a plurality of circumferentially spaced radially movable die segments defining radial gaps therebetween, means acting in the plane of movement of said radially movable die segments for moving said die segments between a first inactive position and a second molding position, said gaps in circumferential extent being greater in said first position than in said second position, and means for bridging said gaps in all positions of said segments and movable with said segments, at least a portion of said bridging means defining said movable die face.

These and other objects and advantages of this invention will become apparent from the following description and drawings of a presently preferred embodiment of which:

FIGURE 1 is a plan view of a die means of this invention with the die cavity in an open position;

FIG. 2 is an enlarged partial plan view of the die means of FIG. 1 with the die cavity in a closed position;

FIG. 3 is an enlarged side elevational view partially in section taken substantially along line 3—3 of FIG. 1;

FIG. 4 is an enlarged partial view of FIG. 3 with the die means in a closed molding position;

FIG. 5 is a modification of the die means of FIGS. 1 to 4 and is comparable to FIG. 4;

FIG. 6 is an enlarged partial view of FIG. 3 showing the molded product in an ejected position;

FIG. 7 is an enlarged partial side sectional view taken substantially along line 7—7 of FIG. 1;

FIG. 8 is an enlarged partial plan view of a portion of FIG. 1 in the vicinity of line 7—7 of FIG. 1;

FIG. 9 is an enlarged perspective view of a portion of a bridging means of this invention;

FIG. 10 is an enlarged perspective view of a die segment of this invention;

FIG. 11 is a perspective view of a product resulting from the use of the die means of this invention; and FIG. 12 is a perspective view of a filling disc used with the die means of this invention.

Referring now to the drawings, the means of this invention include a suitable support member 1. To support member 1 a plurality of spaced compression means 10 are connected, the compression means including cylinder means 12 and pistons to which connecting rods 14 are secured. Compression means 10 may be operated by any suitable power source such as a pneumatic pressure source. The outer ends of connecting rods 14 are integrally connected to sleeve members 16. Sleeve members 16 are threaded at their opposite ends to rotatably and adjustably receive threaded shaft 18. A locknut 20 serves to fix the shaft 18 and sleeve 16 in a selected position of adjustment. Shafts 18 are anchored internally of the outer end of radially movable die segments 22 by pins 24. Each pin 24 passes through a bore 26 in shaft 18 and is threadedly received within die segment 22 as best seen in FIG. 3. To adjust the radial position of die segments 22 depressions 28 in sleeve 16 are provided so that sleeve 16 may be gripped by a wrench means to rotate it thereby driving its associated die segment radially.

The die means of this invention define a die cavity C when each of the members of the die means is operatively positioned. The die members include die segments 22, an upper die member 30, a lower die member plate 32 and a central die member 34, die members 30, 32 and 34 all being generally circular in horizontal cross-section.

Upper die member 30 includes an upper generally cylindrical plate segment 36 and an inverted frusto-conical lower segment 38. An outer annular portion of lower surface 40 of upper die member 30 confronts the die cavity C. Upper die member 30 is reciprocatable vertically as seen in FIG. 3 to provide access to cavity C. It is moved vertically by suitable means such as a pneumatic means (not shown) which includes a reciprocatable piston rod 42.

The lower die member plate 32 is suitably supported in its outer annular portion 44 upon frame members 46 as best seen in FIG. 3. In addition to serving as a die member in its portions which confront die cavity C, lower die member plate 32 also serves other purposes to be described.

Central die member 34 includes a lower frusto-conical central segment 48 having a central bore 50. Segment 48 is connected to plate 32 as by a plurality of threaded bolts 52. Central die member 34 also includes an upper inverted frusto-conical central die segment 54 proportioned to be seated upon lower central die segment 48. Adjacent its perimeter upper central die segment 54 defines a continuous circumferential leg 56 which sealingly mates with the upper surface of lower central die segment 48 when the die means of this invention is performing a molding operation. Upper central die segment 54 defines adjacent its center a cavity 58 for a purpose to be described.

In the embodiment illustrated herein central die member 34 is generally circular in horizontal cross-section and is generally V-shaped in axial cross-section at its side as seen in FIG. 3, that is on a diametrical plane. At the extreme edges of their major surfaces of smallest diameter segments 48 and 54 define a generally semi-cylindrical groove 55 so that the object to be molded is provided with a generally semi-circular internal bead B (see FIG. 11).

Die segments 22 as shown in the embodiment illustrated herein are eight in number. Each is provided with its own compression means 10. Die segments 22 define in cross-section (as seen in FIG. 3) a V-shape substantially complementary to the V-shape configuration defined by die member 34.

As mentioned die segments 22 are movable with respect to the die members. They move radially inwardly and outwardly in a common plane with respect to a central point lying centrally of central die member 34. To guide die segments 22 for radial movement each die segment 22 is provded adjacent its bottom with a T-shaped keyway 60. Each T-shaped key 61 is suitably connected as by bolting by threaded bolts 65 to lower die member plate 32, each of the T-shaped keys 61 being disposed within its corresponding T-shaped keyway 60 to substantially limit the movement of die segments 22 to radial movement inwardly and outwardly of the central point lying centrally of central die member 34.

Lower die member plate 32 includes a die and guide surface 62 positioned radially inwardly of outer annular portion 44. Surface 62 and portion 44 border shoulder 63 of die member plate 32. Each die segment 22 defines at its radial inward and lowermost surface a notch 64 which is proportioned to provide sealing sliding inward and outward radial movement of die segment 22 along surface 62 without contacting shoulder 63.

Each die segment 22 has a pair of sides 66 each of which is spaced from the next adjacent die segments 22. As such adjacent die segments 22 define a gap G between their sides 66. As die segments 22 are moved toward the central die member 34 the width of the gap diminishes, and conversely as die segments 22 are moved away from central die member 34 the gap between the sides 66 of adjacent die segments 22 increases in width.

The movable die segments 22 provide at their inner ends 68 a die face portion 70 and a pair of notches 72, both of which are generally V-shaped in diametrical cross-section. Notches 72 are proportioned to slidably receive bridge 74. Bridges 74 as best seen in FIGS. 7 to 9 include a generally radially disposed arm 76 and a generally circumferentially disposed die surface 78, the thickness of which latter is substantially equal to the depth of notches 72. The die surface 78 in vertical cross-section is of substantially the same configuration as the die face portion 70 of die segments 22. Radially disposed arm 76 and circumferentially disposed die surface 78 are interconnected as by welding in the relationship best seen in FIG. 9. Toward the innermost ends of die segments 22 pairs of holes 80 are provided to accommodate compression springs 82 for assisting in maintaining the relative position of radially disposed arm 76 with respect to die segment sides 66. Thereby die surfaces 78 tend to slide equally in adjacent notches 72 of adjacent die segments 22. In that manner radially disposed arms 76 are maintained generally centrally of their gaps G. Adjacent its remote end each bridge defines an aperture 84 adapted to accommodate one end of a coiled tension spring 86. Each tension spring 86 is connected at its other end to a suitable hook 88 attached to a tension spring ring 90. Tension springs 86 continuously urge bridges 74 radially outwardly of the center of central die member 34 thereby urging circumferentially disposed die faces 78 against die segment notches 72 in all positions of movement of die segments 22.

Die segments 22 intermediate their inner and outer ends 68 and 92 and at their sides 66 define generally circumferentially oriented rectangular slots 94. Slots 94 in adjacent die segments are proportioned to receive key blocks 96. Slots 94 are of sufficient lateral or circumferential extent so that key blocks 96 do not restrict radial movement of die segments 22 and are proportioned so that in all positions of radial movement of die segments 22 key blocks 96 will be retained therein. Bridges 74 define rectangular notches 98 at a position in which they overlie blocks 96 so that neither the bridges 74 nor the key blocks 96 interfere with the operation of the other. Key blocks 96 and slots 94 serve to effectively integrate die segments 22 to assist in maintaining the alignment of the inner ends 68 of die segments 22.

It will be appreciated that die face portions 70 of die segments 22 are arcuate in horizontal cross-section as are die surfaces 78 of bridges 74. When the die means is in a cavity closing compressing position as seen in FIG. 2, the die face comprising die face portions 70 and die surfaces 78 is substantially circular in horizontal cross-section, that is in cross-section transverse to the axis of revolution of central die member 34. While portions of notches 72 may still be exposed to the cavity C, that is minimal and may be reduced to substantially nothing. When the die means is in a cavity opening filling position as seen in FIG. 7, the die face comprising die face portions 70 and die surfaces 78 is also substantially circular in horizontal cross-section and of a diameter greater in the same plane as the diameter of the die face in the compressing position shown in FIG. 2. In the cavity opening filling position the portions of the notches 72 exposed to the cavity C is also greater.

Lower die member plate 32 in addition to being supported at its extremities by frame members 46 is supported at its center by a cylindrical column 100 which rests upon a floor or other suitable supporting means. At its uppermost end cylindrical column 100 provides an upwardly extending cylindrical shaft 102 of reduced diameter. Cylindrical shaft 102 is of substantially the same diameter as upper central die segment cavity 58 and serves to center upper central die segment 54. Shaft 102 also tightly fits within central bore 50 of segment 48 to locate segment 48 with respect to die cavity C. The uppermost end 104 of shaft 102 is disposed slightly below the upper surface of cavity 58 so that it will not interfere with the sealing cooperation between leg 56 and the upper surface of lower central die segment 48.

Means for discharging a formed object from cavity C are best seen in FIGS. 3 and 6. As there seen an ejector plate 110 is shown as supporting a plurality of vertical ejector pins 112, each resting upon an associated head 114 on ejector plate 110. Between head 114 and the lower surface of lower die member plate 32 compression springs 116 are provided.

Lower die member plate 32 in the die portion thereof defines a plurality of cylindrical bores 118 of substantially the same diameter as ejector pins 112. Bores 118 serve to slidably receive and guide the ejector pins. A plurality of adjusting means 120 mounted on suitable frame member 122 include nuts 124 connected as by welding to frame member 122 and threaded bolts 126, the upper ends of which support ejector plate 110. When an object is to be ejected from cavity C a plurality of reciprocatable plungers 128 are actuated by cylinders 130. These plungers 128 rise and contact flange 132 of bearing sleeve 134 which is slidably mounted on column 100 which serves to raise ejector plate 110 urging ejector pins 112 into a position such as that seen in FIG. 6.

Adjusting means 120 are adjusted so that except when an object is to be discharged from die cavity C the faces 136 of ejector pins 112 are substantially flush with the surface of lower die member plate 32.

To fill cavity C with material to be molded such as TFE powder, a filling disc 150 is provided. Disc 150 includes an annular plate 152 defining a central opening 154. Annular plate 152 is concentric with the center of central die member 34 and extends slightly inwardly of cavity C when die segments 22 are in their outermost position. That is best seen in FIG. 3. The inner edge of plate 152 defines central circular opening 154.

As seen in FIGS. 7 and 12 filling disc 150 also includes an upstanding semi-circular shield plate 156 against which an amount of TFE powder material may be placed without permitting the powder to be scattered over the entire means of this invention. When cavity C is to be filled with powder a wiper W or similar means may be used (as seen in FIG. 7) to move powder into the cavity. The powder which remains on filling disc 150 after filling cavity C may then be used in subsequent molding cycles.

FIG. 5 illustrates a modification of the die means of this invention. Except for the means lying across or bridging gaps G and some modification of the die segments themselves, the die means are substantially the same. The modified bridging means comprises a resilient circular continuous sleeve 180 having an outer surface complementary to die face portion 70 of die segment 22 and an inner surface 182 which serves as a die face of a configuration complementary to the die surface of central die member 34. When sleeve 180 serves as the die face, die segments 22 may provide uniform die faces 184 rather than being provided with both die face portions and notches as described in connection with the previously described embodiment. While sleeve 180 may serve as the sole bridging means bridges 74 may be retained to give additional support to sleeve 180 in a molding operation. In FIG. 5, as in FIG. 4 representing the first embodiment, when the die segments move radially inwardly to their fullest extent, the TFE or other moldable powder therein is compressed into a highly desirable commercial product. FIGS. 4 and 5 illustrate the radial cross-section of a representative sinterable product P while FIGS. 3 and 7 illustrate the uncompressed powder U at the outermost radial position of the movable die face of the die means of this invention.

OPERATION

A complete cycle of operation of the illustrative radial die means of this invention will now be described. At this time die segments 22 and the associated bridges 74 will be in the position shown in FIGS. 1, 3 and 7. Upper frustoconical segment 48 of central die member 34 will also be in the position shown in those figures. Upper die member 30 will be elevated as indicated by its absence in FIGS. 6 and 7. Ejector pin faces 136 will be in the position shown in FIG. 3 and will be so positioned by adjusting means 120 and ejector plate 110.

The cavity C is filled with TFE powder as in the manner illustrated in FIG. 7. Then upper die member 30 is lowered by piston rod 42 to the position shown in FIG. 3. Thereafter die segments 22 are urged inwardly by compression means 10 between the position shown in FIG. 3 to that shown in FIG. 4. As they are guided radially inwardly by the complementary T-shaped key 61 and T-shaped keyway 60 they carry bridges 74 with them. Key blocks 96 and the slots 94 in which they lie serve to maintain the relative position of the die segments 22 with respect to each other thereby to provide the desired uniform die face confronting central die member 34. While the permissible movement of piston means 14 is limited and controlled, key blocks 96 and slots 94 serve to assist in aligning die segments 22 hence bridges 74. For fine adjustment of the relative radial positioning of die segments 22 threaded shaft 18 and threaded sleeve members 16 are provided for utilization in the manner previously described.

As gaps G narrow, bridge die surfaces 78 slide circumferentially along notches 68 presenting with die face portions 70 and the portions of notches 68 which diminish in circumferential extent a movable die face substantially circular in horizontal cross-section. In all positions of die segments 22 bridges 74 cooperate therewith to close gaps G to restrict and prevent the radially outward movement of the material positioned in the die cavity which is to be compressed into a product P.

When pressure has been applied for a predetermined period of time the force of compression means 10 is relieved and die segments 22 are drawn outwardly as by suitable conventional springs in compression means 10. Tension springs 86 cause bridges 74 to be withdrawn with die segments 22 until die segments 22 reach the position shown in FIG. 3. Thereafter upper die member 30 is elevated to a position remote from upper central die member segment 54 (again as indicated by its absence from FIGS. 6 and 7). Then cylinders 130 drive plungers 128 upwardly carrying with them bearing sleeve 134 (through flange 132) and concentric ejector plate 110. That moves ejector pins 112 upwardly through cylindrical bores 118 causing faces 136 to elevate thin-walled product P and upper central die member segment 54 (see FIG. 6). As that is done the cavity 58 of segment 54 is withdrawn from shaft end 104. Once segment 54 and product P are removed ejector pins 112 are returned to the position shown in FIG. 3. Thereafter segment 54 and product P are separated, segment 54 is centered on shaft end 104 hence seated by leg 56 on lower central die segment 38. When that is done the cavity C is ready to be filled again and another molding cycle commenced. A similar cycle is provided with the modification of FIG. 5. There the resilient material is compressed toward the position shown in FIG. 5 but is resilient enough to return to an open cavity position comparable to that illustrated in FIG. 3.

In accordance with this invention thin-walled products molded from powder and products having undercuts not easily produced with conventional axial molding processes are obtained. They are producible at high production rates and have outer contours more uniform and closer to tolerances than products produced by conventional molding processes.

While several embodiments of my invention have been described to illustrate my invention it will be apparent that many changes and modifications may be made without departing from its spirit and scope. As such the scope of the invention must be considered in light of the following claims.

I claim:

1. In a radial compression die for forming an article by compressing a mold material from a first volume to a final volume defining the article in an integrated state, the combination comprising a plurality of complementary die segments movable concurrently in a common plane radially toward and away from a common center, one radial end of each said die segment defining a portion of the die cavity and said plurality of die segments defining radial gaps therebetween to provide for unrestricted radial movement of interadjacent die segments, bridging means spanning said gaps at said one radial ends of said die segments throughout the range of radial movement thereof, said one ends and said bridging means defining a peripheral surface of the die cavity, and drive means operable conjointly with said plurality of said die segments to forcedly move said die segments concurrently between an article defining radial position and an open position defining a greater cavity, whereby a mold material introduced to the cavity defined by said open position of said die segments is forcedly compressed by the said one radial ends thereof to an integrated state and to a predetermined configuration as said die segments and said bridging means are mutually moved to said articles defining position.

2. The invention set forth in claim 1 wherein the bridging means comprises a continuous resilient member and defines the peripheral surface of said die cavity, said resilient member being deformed by radial movement of said die segments to vary the extent of said peripheral surface thereof between a first extent when said member is undeformed and a second article defining extent when said member is deformed.

3. The invention set forth in claim 1 wherein said bridging means comprises a plurality of bridging elements there being one element at each said gap and bearing at its opposite ends on the die defining ends of adjacent die segments, said elements being of a length to span said gap throughout the range of radial movement of said die segments, said bridging elements and said one radial ends of said die segments defining said peripheral surface of said die cavity.

4. The invention set forth in claim 3 wherein said one ends of said die segments are recessed at the portions thereof upon which said bridging elements bear to receive said bridging elements throughout the range of said radial movement of said die segments, and to define a substantially uninterrupted regular peripheral die surface with said one ends of said die segments when said die segments are moved to their article defining radial position.

5. The invention set forth in claim 4 wherein each bridging element includes an elongated draft member extending normally therefrom and through the gap between the die segments associated therewith, and biasing means urging said draft member outwardly to maintain said bridging element into firm bearing contact with the recesses in said die segments throughout the range of radial movement thereof.

6. A radial compression die for forming an article by compressing a mold material from a first volume to a reduced final volume defining the article in an integrated state, said die comprising die components defining a fixed portion of the die cavity, and a plurality of complementary die segments cooperable with said die components and movable concurrently in a common plane radially toward and away from a common center of the die cavity, one radial end of each said die segment defining a portion of the die cavity and said plurality of die segments defining radial gaps therebetween to provide for unrestricted radial movement of interadjacent die segments, bridging means spanning said gaps at said one radial ends of said die segments through the range of radial movement thereof, said one ends and said bridging means defining a peripheral surface of the die cavity, and drive means operable conjointly with said plurality of said die segments to forcedly move said die segments concurrently between an article defining radial position and an open position defining a greater cavity, whereby a mold material introduced to the cavity defined by said open position of said die segments is forcedly compressed by the said one radial ends thereof to an integrated state and to a predetermined configuration as said die segments and said bridging means are mutually moved to said article defining position.

7. The invention set forth in claim 8 wherein the bridging means comprises a continuous resilient member and defines the peripheral surface of said die cavity, said resilient member being deformed by radial movement of said die segments to vary the extent of said peripheral surface thereof between a first extent when said member is undeformed and a second article defining extent when said member is deformed.

8. The invention set forth in claim 9 wherein said bridging means comprises a plurality of bridging elements, there being one element at each said gap and bearing at its opposite ends on the die defining ends of adjacent die segments said elements being of a length to span said gap throughout the range of radial movement of said die segments, said bridging elements and said one radial ends of said die segments defining said peripheral surface of said die cavity.

9. The invention set forth in claim 8 wherein said one ends of said die segments are recessed at the portions thereof upon which said bridging elements bear to receive said bridging elements throughout the range of said radial movement of said die segments, and to define a substantially uninterrupted regular peripheral die surface with said one ends of said die segments when said die segments are moved to their article defining radial position.

10. The invention set forth in claim 9 wherein each bridging element includes an elongated draft member extending normally therefrom and through the gap between the die segments associated therewith, and biasing means urging said draft member outwardly to maintain said bridging element into firm bearing contact with the recesses in said die segments throughout the range of radial movement thereof.

References Cited by the Examiner
UNITED STATES PATENTS

| | | | |
|---|---|---|---|
| 1,676,184 | 7/1928 | Gass et al. | 249—180 |
| 1,891,160 | 12/1932 | Jespersen | 249—180 X |
| 3,179,979 | 4/1965 | Bundy et al. | 18—16.5 |

J. SPENCER OVERHOLSER, *Primary Examiner.*

E. MAR, *Assistant Examiner.*